June 19, 1928.

T C. COLTRIN 1,674,193

CABINET NEST

Filed Jan. 3, 1927

INVENTOR.
T. Charles Coltrin
BY
Booth & Booth
ATTORNEYS

June 19, 1928.
T C. COLTRIN
1,674,193
CABINET NEST
Filed Jan. 3, 1927   3 Sheets-Sheet 3
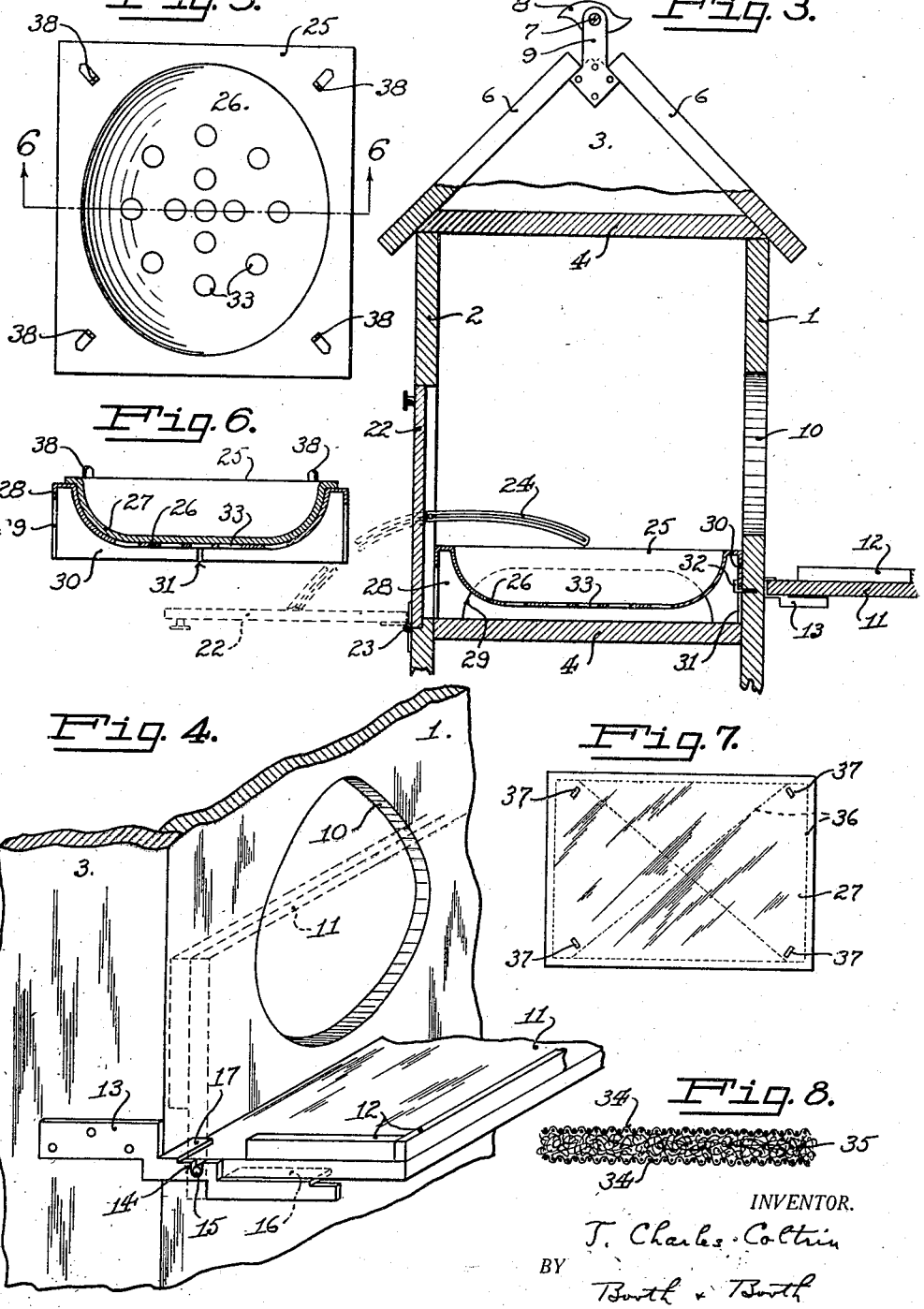

Patented June 19, 1928.

1,674,193

UNITED STATES PATENT OFFICE.

T CHARLES COLTRIN, OF SEBASTOPOL, CALIFORNIA.

CABINET NEST.

Application filed January 3, 1927. Serial No. 158,517.

My invention relates to nest structures for poultry. The principal object of the invention is to provide a compact structure capable of housing a plurality of nests, and which is easily kept clean and free from vermin. For this purpose convenient access to the nests is provided, from the rear of the cabinet structure, and the nests proper are removable therefrom, and are formed in such a manner, to be described hereinafter, as to render them easy to clean.

Another object is to eliminate as far as possible, breakage of eggs. This is accomplished by providing individual nest compartments, each with an entrance aperture of such a form as to permit the hen, when occupying the nest, to protect herself against the intrusion of other hens; by providing an entry platform so constructed that any eggs dropped upon it will not roll off; and by providing means for retaining the nest proper within its compartment, so that if the rear door be opened, for the removal of eggs, while a hen is upon the nest, she cannot, in her struggle to escape, kick the nest out and so cause the eggs to fall upon the ground. Eliminating breakage, of course, not only directly increases the number of eggs recovered, but prevents the hens from becoming "egg eaters" and "egg breakers."

A still further object of the invention is to prevent roosting in the nests or upon the top of the cabinet, thus preventing, to a large degree, the fouling of nests and cabinet, and reducing the labor of cleaning and vermin extermination. Other objects and advantages will become apparent from the following complete description of a preferred embodiment of the invention, which should be read with the understanding that the form, construction, and arrangement of the several parts may be varied, within the limits of the claims hereto appended, without departing from the spirit of the invention as set forth in said claims.

With this in view, a preferred embodiment of my invention will now be described fully with reference to the accompanying drawings, wherein:

Fig. 3 is a part sectional end view of one nest compartment, taken on the line 3—3 of Fig. 2 and enlarged.

Fig. 4 is a perspective detail of one compartment at the end of a cabinet, showing the entrance aperture and one end of the entry platform with the supporting bracket therefor.

Fig. 5 is a plan view of one of the nest frames, the lining being omitted.

Fig. 6 is a section taken on the line 6—6 of Fig. 5 and showing the nest lining in position.

Figs. 7 and 8 are respectively a plan and a section, the latter enlarged, of the nest lining.

Figure 2:
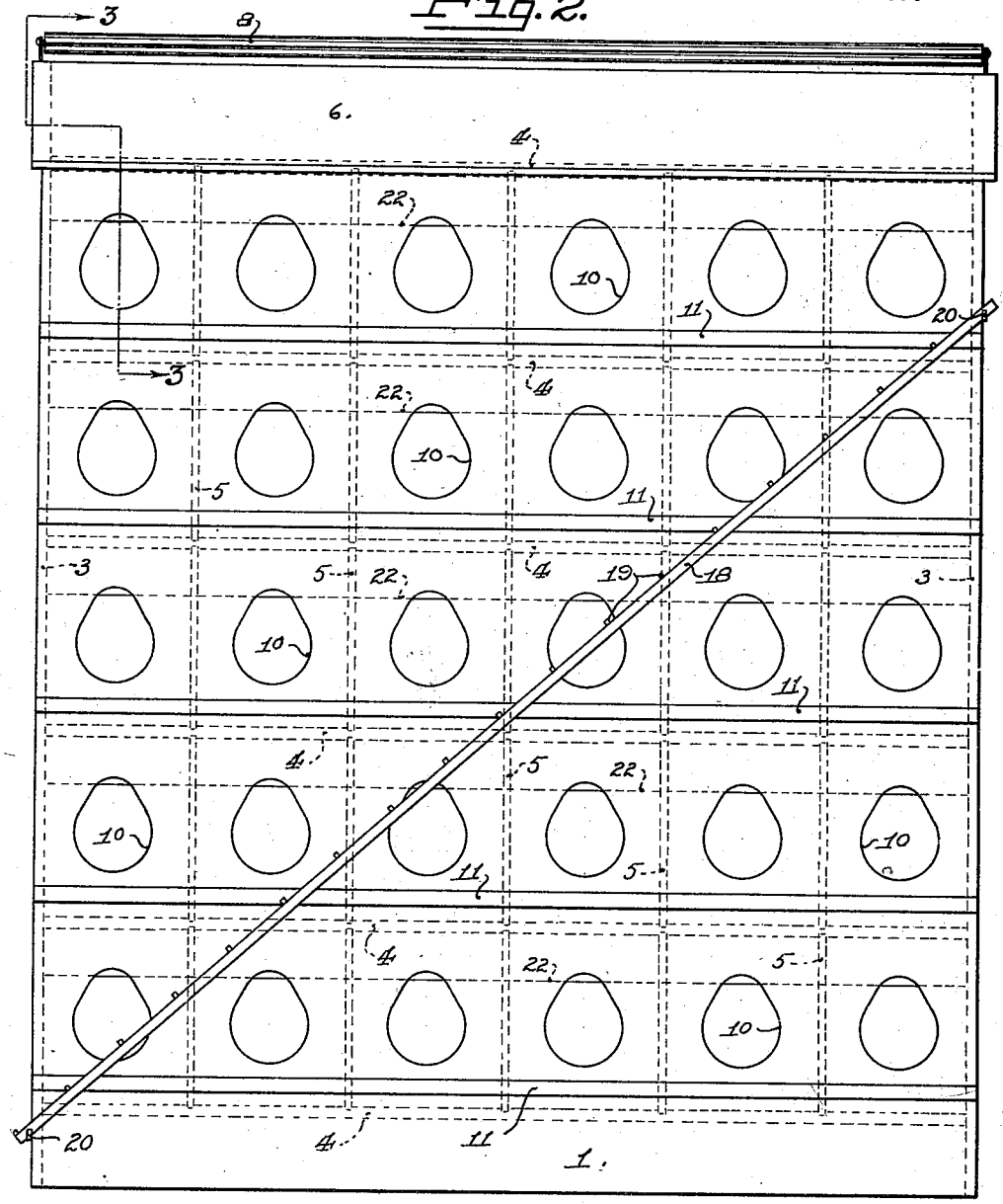
Fig. 2 is a front elevation of one cabinet with the approach ladder.

Although any desired number of nest compartments may be provided in each cabinet, I have found it convenient and practicable to provide five horizontal rows, each row having six compartments, in each cabinet, as shown in Fig. 2. The reference numeral 1 designates the front wall of the cabinet, 2 (Fig. 3) is its rear wall, 3 (Fig. 2) designates its end walls, and 4 and 5 are respectively, horizontal and vertical interior partitions dividing the cabinet into its thirty individual compartments.

Each compartment is thus entirely shut off from its neighbors, and the joints between the several walls and partitions are so formed, in any suitable manner well known in the cabinet-making art, as to be not only rigid, but tight, to exclude vermin and dirt. The size of each compartment is such that it will just accommodate one hen comfortably, preferably about 10 inches wide by 11 inches deep by 13 inches high.

Figure 1:
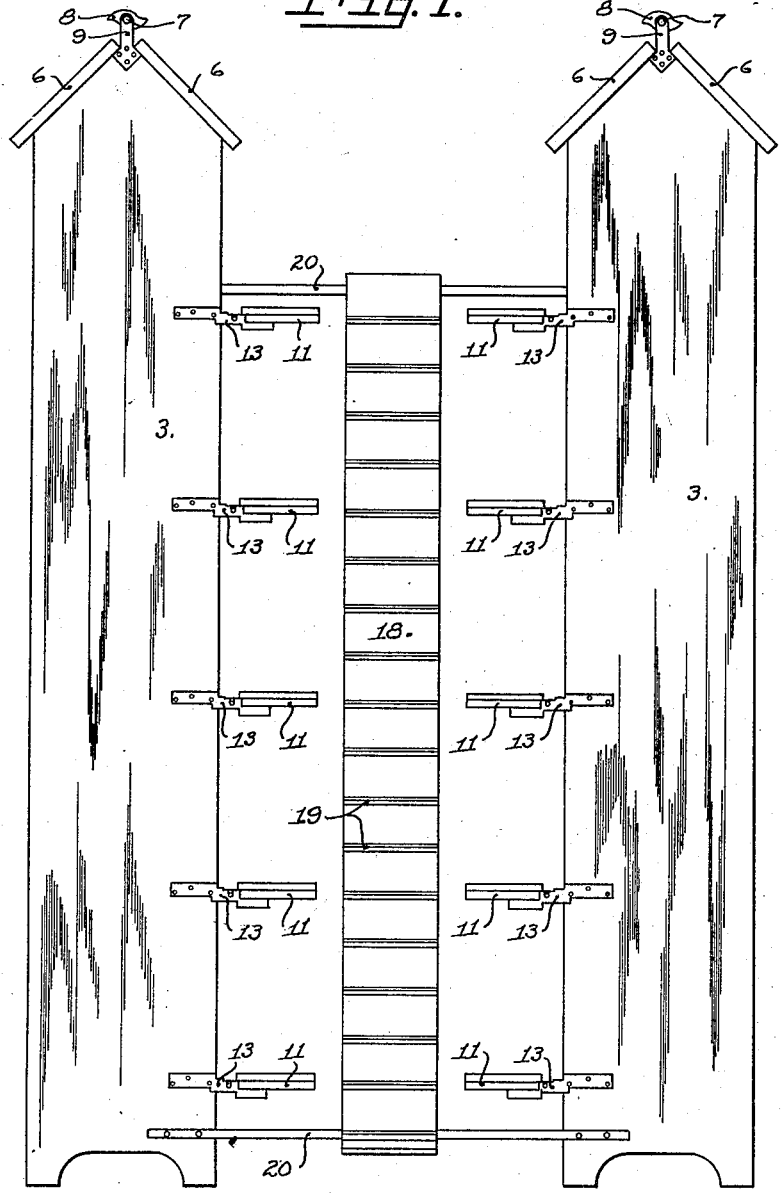
Fig. 1 is an end elevation of a complete unit consisting of two similar cabinets with a common approach ladder between them.

The entire cabinet is surmounted by a sloping roof 6, Figs. 1, 2 and 3, to shed rain and to prevent fowl from roosting upon its top. At the apex of said roof is mounted, in pivots 7, a rotatable bar 8, having a double cam shaped cross section, to prevent roosting upon said apex. This shape, I have found by experience, is much more effective that a round or other shaped bar in throwing off a fowl attempting to roost upon it, because it not only gives no foot-hold upon itself, but prevents the fowl from gaining a foot-hold upon the upper edges of the roof members 6. These upper edges are preferably slightly spaced, as shown in Fig.

3, to provide ventilation for the space between the roof 6 and the uppermost horizontal partition 4. The rotatable bar 8 is best supported by brackets 9 extending upwardly from the cabinet end members 3.

Each compartment has an entrance aperture 10, Figs. 2, 3 and 4, in the front wall 1 of the cabinet. I have found by experience that these apertures are best made approximately oval in shape, with their major axes approximately vertical, as indicated, for the reason that such shape provides free entrance to the nest, and yet permits the hen, when occupying the nest, to best protect herself and her nest against the intrusion of other hens. This protection is secured because the hen sits upon the nest with her head within or slightly protruding from the upper portion of the aperture, and is therefore in the best position to fight off intruders.

In front of each horizontal row of compartments is an entry shelf or platform 11, Figs. 1, 2, 3, and 4, upon which the hen stands before entering the nest. These platforms are provided with raised marginal flanges or rims 12, Figs. 3 and 4, which prevent any eggs that may be dropped upon the platforms, by hens waiting to enter nests, from rolling off and breaking. The platforms 11 are hinged so that they can be folded up against the front 1 of the cabinet, as shown in dotted lines in Fig. 4. In this folded position, the platforms partially cover the entrance apertures 10, sufficiently to keep hens from entering. Thus the platforms 11 serve as doors to exclude the fowl at night, to prevent them from roosting in the nests, and to close off any row or rows of nests for any other purpose.

The platforms 11 are preferably mounted in brackets 13, Figs. 1 and 4, secured to and extending forwardly from the cabinet ends 3. These brackets are best formed of metal, and each is provided with a notch 14, Fig. 4, in which the pivot pin 15 of the platform rests, and with laterally projecting flanges 16 and 17 bearing respectively against the bottom and top of said platform to hold it in its extended or horizontal position. The notches 14 are far enough away from the front wall of the cabinet so that the platform, when folded up against said front wall, will remain in such position without fastening. The notches 14 further provide for the ready removal of the platforms for cleaning or painting.

A suitable ladder is provided to enable the fowl to reach any platform, such ladder being preferably an inclined runway 18, Figs. 1 and 2, provided with spaced cleats 19, and extending diagonally across the front of the entire cabinet from the ground to the highest platform 11. In order to permit the use of a single ladder common to two cabinets, I prefer to arrange the cabinets in pairs, face to face, as shown in Fig. 1, with the ladder 18 between their platforms 11. Thus any platform, and consequently any nest, of either cabinet, can be reached by one ladder.

Figure 9:
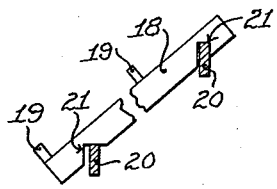
Fig. 9 is a detail, enlarged, showing the method of supporting the approach ladder.

A convenient mounting for the ladder 18 is shown in Figs. 1, 2, and 9, and comprises bars 20 extending horizontally between and secured to the ends of the two cabinets of the pair. One such bar is positioned near the ground at one end of the cabinets, and the other at the opposite ends at about the level of the highest platform 11. The ladder 18 is notched on its under side, as shown at 21 in Fig. 9, to fit over the bars 20. Thus the ladder is easily removable, but is held securely when in position. The bars 20 serve not only as supports for the ladder, but as braces between the two cabinets of the pair, to hold them in the desired relative positions.

The rear wall 2 of the cabinet is provided with suitable doors, through which access may be had to the nests for removal of eggs and for cleaning. I prefer to make such doors as shown at 22 in Figs. 2 and 3, one at each horizontal row of compartments and extending the full length of the cabinet. They are best hinged at the bottom, as shown at 23 in Fig. 3, and open outwardly to form, when open, horizontal shelves at the levels of the compartment floors, as indicated in dotted lines. Suitable stop brackets or devices, of any well known form as indicated, for example, at 24, may be employed to hold the doors in their open horizontal positions. Suitable latching means, not shown, may also be provided to keep the doors closed.

The nests proper, which fit within and are removable from the compartments of the cabinet, are formed as bottomless frames 25 having saucer-shaped depressions 26 in their tops, as shown in Figs. 3, 5, and 6, and said depressions are provided with suitable padded linings 27 (Fig. 6) to be described presently. The nest frames 25 are best made by die stamping from sheet metal, and are formed with vertically disposed side and rear flanges 28, cut away as shown at 29 to permit ventilation, and with a front flange 30 having a straight bottom edge. A notch or slot 31 is formed in said front flange, and is adapted to fit over a suitable hook 32, Fig. 3 extending from the front wall of the compartment for the purpose of holding the frame in place. Thus the frame cannot be kicked out the rear door by the hen in her struggle to escape through the front aperture 10.

The frame is easily removed for cleaning, however, merely by lifting it slightly at its front, to free it from the hook 32, and then drawing it out rearwardly on to the shelf formed by the open door 22. The front flange 30 of said frame acts as a scraper to remove dirt from the floor of the compartment, such dirt falling through the crack formed between the rear wall and the open door 22. Thus removal of the frame automatically cleans the bottom of the compartment.

The nest frame 25 is preferably made about two and one half inches high, and the depression 26 in its top is about two inches deep, leaving an air space of about one half inch between it and the floor of the compartment. The bottom of said depression is ventilated, preferably by a series of punched holes 33. The pad 27, which lines the depression 26, is preferably formed of two layers of suitable fabric 34 such as canvas, with a layer of excelsior or other suitable padding 35 between, as indicated in Fig. 8, and the whole suitably bound together, as by the stitching indicated at 36 in Fig. 7. The lining 27 may be held in position on the frame in any desired manner, as for example by providing it with holes 37, Fig. 7, which fit over tongues 38, Figs. 5 and 6, stamped out and bent upwardly from the top of the frame 25.

The nest thus formed is simple, inexpensive, and easily kept clean. By making the frame 25 as a stamping from suitable sheet metal, as for example steel subsequently galvanized, it can be disinfected readily, and is light and easy to handle. The pad or lining 27 can be removed quickly for cleaning, disinfecting, or renewal, and can be reversed when one side becomes soiled.

I claim:—

1. In a nest structure for poultry, a cabinet divided into a plurality of separate compartments arranged in a substantially horizontal row, each compartment having an entrance aperture in its front wall; an entry platform common to all said apertures; a raised flange formed upon the outer edge portion of said platform; and pivotal mountings for said platform adapting it to partially close said apertures.

2. In a nest structure for poultry, a cabinet having a nest compartment with an entrance aperture; a door in a wall of said compartment, said door forming, when open, a substantially horizontal shelf at the approximate level of the floor of said compartment; and a nest within said compartment and adapted for removal therefrom on to said shelf.

3. In a nest structure for poultry, a cabinet having a nest compartment with an entrance aperture; a door in a wall of said compartment, said door forming, when open, a substantially horizontal shelf at the approximate level of the floor of said compartment; a nest within said compartment and adapted for removal therefrom on to said shelf; and means for removably retaining said nest in said compartment.

4. In a nest structure for poultry, a cabinet having a nest compartment with an entrance aperture; a door in a wall of said compartment, said door forming, when open, a substantially horizontal shelf at the approximate level of the floor of said compartment; and a nest within said compartment and adapted for removal therefrom on to said shelf, said nest having a flange positioned to scrape the floor of said compartment during its removal therefrom.

5. In a nest structure for poultry, a cabinet having a nest compartment; and a nest removably positioned within said compartment; said nest comprising side flanges resting upon the bottom of said compartment and a top member supported by said flanges and provided with a depressed central portion.

6. In a nest structure for poultry, a cabinet having a nest compartment; and a nest removably positioned within said compartment, said nest comprising side flanges resting upon the bottom of said compartment and a top member supported by said flanges and provided with a depressed and perforated central portion.

7. In a nest structure for poultry, a cabinet having a nest compartment; and a nest removably positioned within said compartment, said nest being formed from a single sheet of metal with its edge portions bent downwardly to form flanges adapted to rest upon the floor of the compartment and with a depression in its central top portion.

8. In a nest structure for poultry, a cabinet having a nest compartment; a nest frame removably positioned within said compartment, said frame comprising side flanges resting upon the bottom of said compartment and a top member supported by said flanges and provided with a depression; and a removable resilient lining positioned within said depression.

9. A nest structure for poultry comprising a cabinet; a roof therefor, said roof having a ventilating aperture and a freely rotatable bar positioned above the ventilating aperture of said roof.

10. A nest structure for poultry comprising a cabinet; a hip-roof therefor, said roof having a ventilating aperture at its ridge; and a freely rotatable bar mounted above said aperture and substantially parallel to the ridge of said roof.

In testimony whereof I have signed my name to this specification.

T CHARLES COLTRIN.